United States Patent [19]

Marks et al.

[11] Patent Number: 4,658,007

[45] Date of Patent: Apr. 14, 1987

[54] POLYISOCYANURATE-BASED POLYOXAZOLIDONE POLYMERS AND PROCESS FOR THEIR PREPARATION

[75] Inventors: Maurice J. Marks; Raymond A. Plepys, both of Lake Jackson, Tex.

[73] Assignee: The Dow Chemical Company, Midland, Mich.

[21] Appl. No.: 731,253

[22] Filed: May 7, 1985

[51] Int. Cl.$^4$ ............... C08G 18/22; C08G 18/38; C08G 18/64

[52] U.S. Cl. ................................... 528/55; 528/73

[58] Field of Search ......................... 528/73, 55

[56] References Cited

U.S. PATENT DOCUMENTS

| | | | |
|---|---|---|---|
| 3,020,262 | 2/1962 | Speranza | 528/73 |
| 3,305,494 | 2/1967 | Schramm et al. | 528/73 |
| 3,313,747 | 4/1967 | Schramm | 528/73 |
| 3,334,110 | 8/1967 | Schramm | 528/96 |
| 3,471,442 | 10/1969 | DiLeone | 528/73 |
| 3,821,130 | 6/1974 | Barron et al. | 521/160 |
| 3,888,803 | 6/1975 | Doerge et al. | 521/160 |
| 4,101,465 | 7/1978 | Lockwood et al. | 521/118 |
| 4,129,695 | 12/1978 | Bonin | 521/108 |
| 4,280,007 | 7/1981 | Meisert et al. | 521/159 |
| 4,294,934 | 10/1981 | Groegler et al. | 521/160 |
| 4,374,210 | 2/1983 | Ewen et al. | 521/159 |
| 4,568,703 | 2/1986 | Ashida | 528/55 |

OTHER PUBLICATIONS

IwaKura et al., Jour. Polymer Sci., Part A-1, vol. 4, pp. 751–760 (1966).

*Primary Examiner*—Herbert S. Cockeram
*Attorney, Agent, or Firm*—G. C. Cohn

[57] ABSTRACT

This invention is an improvement in a process by which a polyepoxide and a polyisocyanate are reacted to form an oxazolidone containing polymer or polymer precursor. This improvement comprises conducting said reaction in the presence of a catalytic amount of an organoantimony iodide catalyst. In such improved process, the oxazolidone forming reaction proceeds much more rapidly than the trimerization reaction of the polyisocyanate or the homopolymerization of the polyepoxide. As a result, the product polymer or polymer precursor contains a surprisingly small proportion of isocyanurates. In addition, the overall rate of reaction is substantially increased as compared to that achieved with conventional catalysts, thereby reducing the time and stringency of conditions required to form the desired product.

14 Claims, No Drawings

POLYISOCYANURATE-BASED POLYOXAZOLIDONE POLYMERS AND PROCESS FOR THEIR PREPARATION

BACKGROUND OF THE INVENTION

This invention relates to polyoxazolidone polymers and a process for preparing same. More particularly, this invention relates to polyoxazolidone polymers containing relatively small proportions of trimerized polyisocyanates.

It is well known to react an epoxide with an isocyanate to form an oxazolidone. Such reactions are generally carried out in the presence of a catalyst. Typical catalysts for this reaction include lithium bromide, quaternary ammonium salts, tertiary amines, Lewis acids, such as aluminum chloride, complexes of these Lewis acids with a Lewis base, and similar materials.

In similar manner, polyoxazolidone polymers can be prepared by reacting a diepoxide (i.e. a compound having at least two oxirane groups) with a polyisocyanate (i.e. a compound having at least two isocyanate groups). However, whereas the reaction of a monoepoxide and a monoisocyanate to form an oxazolidone proceeds relatively cleanly and in good yield, the corresponding reaction between higher functionality epoxides and isocyanates results in the formation of substantial quantities of undesirable byproducts. The major by-products are polyethers prepared by the homopolymerization of the polyepoxide and isocyanurates formed by the trimerization of the polyisocyanate. Of these, the trimerization reaction is particularly disadvantageous since the trimerization leads to the formation of very high functionality materials which give rise to very highly cross-linked, brittle polymers. Unfortunately, the catalysts conventionally used in preparing polyoxazolidones do not selectively catalyze the oxazolidone reaction, and substantial quantities of isocyanurates are formed. Generally, the polyoxazolidone contains about 20 to 40 mole percent or more of isocyanurates.

For this reason, it would be desirable to provide a process whereby a polyepoxide and polyisocyanate are reacted to form a polyoxazolidone polymer containing relatively small quantities of trimerized isocyanates.

SUMMARY OF THE INVENTION

This invention is such an improved process for preparing polyoxazolidones.

In one aspect, this invention comprises an oxazolidone-containing polymer or polymer precursor which is a reaction product of a polyepoxide and a polyisocyanate, characterized in that said polymer or polymer precursor contains less than about 15 mole percent of isocyanurate groups. Such polymer, or a polymer derived from such precursor, exhibits improved thermal and mechanical properties compared to similar polymers containing a higher proportion of isocyanurate groups.

In another aspect, this invention is an improvement in a process by which a polyepoxide and a polyisocyanate are reacted to form an oxazolidone containing polymer or polymer precursor. This improvement comprises conducting said reaction in the presence of a catalytic amount of an organoantimony iodide catalyst. In such improved process, the oxazolidone forming reaction proceeds much more rapidly than the trimerization reaction of the polyisocyanate or the homopolymerization of the polyepoxide. As a result, the product polymer or polymer precursor contains a surprisingly small proportion of isocyanurates. In addition, the overall rate of reaction is substantially increased as compared to that achieved with conventional catalysts, thereby reducing the time and stringency of conditions required to form the desired product.

DETAILED DESCRIPTION OF THE INVENTION

In this invention a polyepoxide is reacted with a polyisocyanate in the presence of certain antimony catalysts to prepare a polyoxazolidone polymer or polymer precursor containing a low proportion of isocyanurate groups. This reaction is conducted in the presence of an organoantimony iodide catalyst. Suitable catalysts are as represented by the structure

wherein R is as defined hereinafter, and x and y are each numbers from about 1 to 4, provided that $x+y \leq 7$. Preferably, the antimony is pentavalent, i.e. the oxidation state of the antimony atom is $+5$.

The antimony catalysts most preferred herein are are triorganoantimony di- or tetraiodides corresponding to the structure

wherein n is 2 or 4. Each of the groups R is independently aliphatic, cycloaliphatic, aromatic, alkyl or similar organic group which may contain hetero atoms or other substituent groups which are inert to the reaction of the polyepoxide and the polyisocyanate to form a polyoxazolidone polymer or polymer precursor. In the case of a polymer precursor, the substituent group is also advantageously inert to the reaction thereof to form a polymer. Suitable substituent groups include aryl-bonded halogen, alkoxy and the like.

Preferred as the R groups are aromatic groups having 12 or fewer carbon atoms such as phenyl, tolyl, naphthyl, o-, m- or p-halo-benzyl and the like; alkyl groups such as methyl, ethyl, n-propyl, isopropyl, n-butyl and other alkyl groups having from about 4 to 12 carbon atoms as well as alkoxylated or halogenated derivatives thereof; benzyl and inertly substituted benzyl groups; and the like.

The preferred di- and tetraiodide catalysts are substantially equivalent in their activity and selectivity in the oxazolidone forming reaction. However, the tetraiodide is more preferred in making isocyanate-terminated polyoxazolidone polymer precursors because the products of the diiodide-catalyzed reaction tend to form small quantities of isocyanurates upon standing. The tetraiodide-catalyzed isocyanate terminated reaction products are significantly more stable.

Exemplary antimony catalysts useful herein include trimethylantimony diiodide, trimethylantimony tetraiodide, triethylantimony diiodide, triethylantimony tetraiiodide, triisopropylantimony diiodide, triisopropylantimony tetraiiodide, methyldiethylantimony diiodide methyldiethylantimony tetraiodide, tri-n-butylantimony diiodide, tri-n-butylantimony tetradiiodide, triphenylantimony diiodide, triphenylantimony tetradiiodide, tribenzylantimony diiodide, tribenzylantimony tetraiiodide, tri-n-hexylantimony di- or tetraiiodide and the like.

The preferred antimony catalyst is advantageously employed in relatively small amounts in the reaction. Typically from about 0.5 to about 20, preferably about 1 to about 5, and more preferably about 2 to about 3 moles of the antimony catalyst are employed in the reaction per 100 mole of the polyepoxide. Use of the catalyst in the preferred and more preferred ranges provides for minimal isocyanurate formation without using unnecessary amounts of catalyst.

The antimony catalyst is readily prepared by reacting the corresponding organoantimony compound ($R_xSb$) with iodine ($I_2$). When equimolar quantities thereof are employed, the diiodide is formed. Addition of a second mole of iodine forms the tetraiodide. Generally, the reaction of the iodide and the organoantimony compound is conducted in a solvent. Polyepoxides and polyisocyanates are suitable such solvents. The reaction of the organoantimony compound with iodine proceeds readily at ambient or elevated temperature. This reaction proceeds particularly well at the conditions of the polymerization of the polyepoxide and the polyisocyanate. Accordingly, it is possible, and generally preferable, to prepare the antimony catalyst in situ by charging the organoantimony compound and iodine to the polymerization vessel and carrying out the polymerization reaction and the catalyst-forming reaction simultaneously. The organoantimony compound used as a starting material is readily formed in the reaction of the corresponding organomagnesium halide and antimony trichloride or tribromide.

The polyepoxide used in this invention contains a plurality of epoxy, i.e. $\alpha,\beta$-oxirane groups. Although said polyepoxide can have as many as 100 or more epoxy groups, it is highly preferred that the functionality of the polyepoxide be relatively low, i.e. from about 2 to about 10, more preferably about 2 to about 4, and most preferably about 2 to 3. Lower functionalities are preferred because they give rise to less highly cross-linked polymers, which tend to have better physical and thermal properties as well as being more easily processed. Diepoxides give rise to linear, thermoplastic polymers when reacted with a diisocyanate.

Among the polyepoxides usefully employed herein are those represented by the general structure

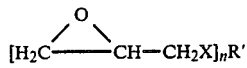
I.

wherein X is the residue of an active hydrogen-containing moiety after removal of said active hydrogen, R' is an organic polyradical and n is at least 2. n is preferably from about 2 to 4 more preferably about 2 to 3. Such polyepoxides are advantageously prepared by reacting a compound having a plurality of groups containing active hydrogen atoms with a halogen-containing oxirane such as epichlorohydrin or epibromohydrin.

In structure I, the group X is advantageously —O—, —NH—,

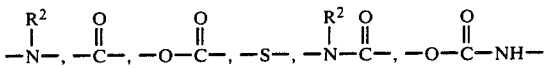

or a similar group, wherein $R^2$ is inertly substituted lower alkyl or phenyl. Preferably, the group X is —O— and the polyepoxide is one prepared in the reaction of a polyhydroxyl containing compound with a halogenated oxirane as discussed hereinbefore.

Exemplary polyepoxides include epoxy-terminated derivatives of bisphenols, such as are represented by the structure

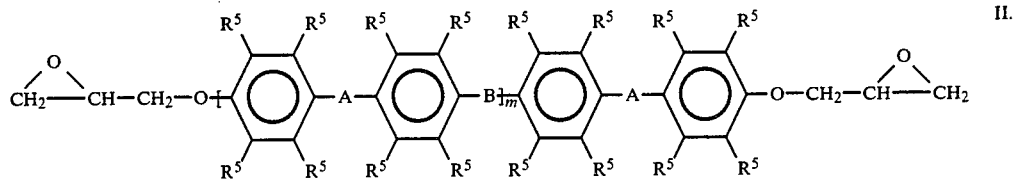
II.

wherein each A is independently a lower alkylene group such as methylene, ethylene, isopropylidine and the like, —O—, —S—,

and the like, each B is as defined by A, and/or $+OCH_2CHOHCH_2O—$, each $R^5$ is independently hydrogen, halogen or lower alkyl, and m is a number from about 0 to about 30, preferably 0 to about 10 and more preferably about 0.1 to about 3. In addition, derivatives of the materials represented by structure II in which one or more of the positions on the group A is substituted with an inert substituent such as halogen, aryl, alkyl and the like are also useful herein. Suitable such epoxides include the commercially available resinous reaction products of an epihalohydrin with the diverse bisphenols and halogenated bisphenols, particularly the reaction products of an epihalohydrin with bisphenol A or bisphenol F or halogenated derivatives thereof. These resins preferably have an average equivalent weight from about 155 to about 2000. Suitable such epoxy resins include those sold commercially as DER* 317, DER 330, DER 331, DER 332, DER 333, DER 337, DER 642U, DER 661, DER 662, DER 663U, DER 664, DER 664U, DER 667, DER 673MF, DER 542, DER 511-A80, DER 521-A75, and DER 599 epoxy resins, all available from The Dow Chemical Company. Also suitable are the corresponding aromatic glycidyl amine resins wherein the various ether linkages are replaced by —NH— groups.
*Trademark of The Dow Chemical Company Also useful herein are the so called polynuclear phenol glycidyl ether derived resins.

Also suitable are the so-called epoxy phenol novolac resins and epoxy cresol novolac resins which can be represented by the structure

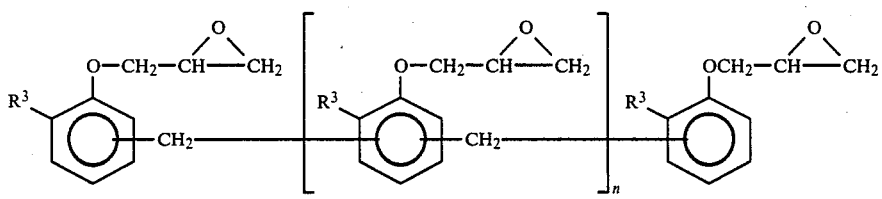

wherein n is a number from about 0–20 and each $R^3$ is independently hydrogen, halogen, lower alkyl, aryl or aralkyl. Halogenated derivatives of such resins are also useful herein.

In addition, epoxy resins prepared by reacting an organic diene with an aromatic hydroxyl-containing compound and subsequently reacting the resulting product with an epihalohydrin, as are described in U.S. Pat. No. 4,390,680 to Nelson, are useful herein.

Suitable aliphatic epoxy resins include the hydrogenated derivatives of the foregoing aromatic epoxy resins, as well as those in which the group R' of Structure I is lower alkylene, especially ethylene and isopropylene, a dialkylene ether or a polyoxyalkylene group. Such resins are advantageously prepared by reacting an alkylene glycol or polyether polyol with an epihalohydrin. Examples of such resins include DER 732 and DER 736, both of which are available from The Dow Chemical Company.

Also useful are aliphatic epoxy resins prepared in reaction of cycloolefins with peracetic acid, as well as diglycidyl ethers of cyclic dicarboxylic acids.

The foregoing polyepoxide is reacted with a polyisocyanate in the presence of the aforedescribed antimony catalyst to form a polyoxazolidone. The polyisocyanate may be highly functional but preferably has the functionality of less than about 10, preferably about 2 to 4, and more preferably about 2 to 3.

Organic polyisocyanates which may be employed include aromatic, aliphatic and cycloaliphatic polyisocyanates and combinations thereof. Representative of these types are diisocyanates such as m-phenylene diisocyanate, tolylene-2,4-diisocyanate, tolylene-2,6-diisocyanate, xylenediisocyanate, tetramethylxylene diisocyanate, isophorone diisocyanate, hydrogenated diphenyl methane diisocyanate, hydrogenated xylene diisocyanate, hexamethylene-1,6-diisocyanate, cyclohexane-1,4-diisocyanate, hexahydrotolylene diisocyanate (and isomers), naphthalene-1,5-diisocyanate, 1-methoxyphenyl-2,4-diisocyanate, diphenylmethane-4,4'-diisocyanate, 4,4'-biphenylene diisocyanate, 3,3'-dimethoxy-4,4'-biphenyl diisocyanate, and 3,3'-dimethyl-4,4'-diphenyl diisocyanate, the triisocyanates such as trifunctional polymethylene polyphenylisocyanates and tolylene-2,4,6-triisocyanate; and tetraisocyanates such as 4,4'-dimethyldiphenylmethane-2,2',5,5'-tetraisocyanate and the like.

A crude polyisocyanate may also be used in the practice of the present invention, such as the crude toluene diisocyanate obtained by the phosgenation of a mixture of toluene diamines or the crude diphenylmethylene diisocyanate obtained by the phosgenation of crude diphenylmethylenediamine. The preferred undistilled or crude isocyanates are disclosed in U.S. Pat. No. 3,215,652.

Alternatively, an isocyanate-terminated prepolymer or quasi-prepolymer prepared by reacting an excess of a polyisocyanate with a polyol of low or high equivalent weight may be employed as the polyisocyanate herein.

The relative proportions of the polyepoxide and polyisocyanate employed control to a large extent the characteristics of the product polyoxazolidone. By using a stoichiometric excess of the polyisocyanate, an isocyanate-terminated polyoxazolidone polymer is prepared. Similarly, the use of an excess of the polyepoxide leads to the formation of epoxide terminated polymers. The use of excess amounts of the polyepoxide or polyisocyanate can also be used to control the molecular weight of the polymer, since larger excesses of either component tend to produce lower molecular weight polymers. Using substantially equivalent amounts of the polyepoxide and polyisocyanate provides a process where higher molecular weight polyoxazolidones can be formed. Thus, the relative amounts of polyepoxide and polyisocyanate employed may vary over a relatively wide range, such as for example 10:1 to 1:10, on a molar basis.

The oxazolidone-forming reaction is advantageously carried out by heating together the polyisocyanate and polyepoxide in the presence of the antimony catalyst described herein. In general, a reaction temperature from about 80° to about 180° C. is suitable. The optimum reaction temperature depends somewhat on the particular polyisocyanate employed. Aromatic polyisocyanates which trimerize relatively slowly, such as diiphenylmethane diisocyanate are preferably reacted at a temperature from about 80° to 120° C. Those such as toluenediisocyanate which more rapidly trimerize are preferably reacted at a temperature from about 120° to 175° C. Aliphatic polyisocyanates are also preferably reacted at about 120°–175° C. It has been found that the use of significantly higher or significantly lower temperatures than described in this paragraph tends to promote the formation of higher amounts of isocyanurate groups. It will also be apparent that changes in temperature and amount of catalyst will affect the rates of the reaction. Under the conditions of temperature and amount of catalyst described herein, the reaction is typically completed in from about 5 minutes to 8 hours, and more typically from about 5 minutes to 4 hours.

The oxazolidone forming reaction is generally carried out neat, but may if desired be carried out in the presence of a suitable diluent or solvent for the reactants. Ketones, aromatic hydrocarbons or other solvents which are inert to the polymerization reaction are suitable. Solvents which only weakly or negligibly coordinate with the catalyst are preferred since they tend to inhibit the oxazolidone forming reaction. The reaction can be run batch-wise or continuously, as in a coil reactor.

Isocyanate-terminated oxazolidone polymer precursors prepared according to this invention can be reacted with a polyol, polyamine or other material containing a plurality of active hydrogen atoms to form a polyurethane or polyurea. Generally speaking, the isocyanate-terminated oxazolidone polymer precursor is used in the same manner as conventional polyisocyanates to prepare a polyurethane. The use of the oxazolidone polymer or precursor does not generally require any special processing conditions, and any of the conventional techniques for preparing polyurethanes are suitably used. In particular, polyurethane films, elastomers, structural foams, rigid foams, flexible foams and the like all can be prepared with the oxazolidone polymer or precursor of this invention. Techniques for preparing polyurethane polymers which may be employed in conjunction with the isocyanate-terminated oxazolidone polymer precursor include, for example, those described in U.S. Pat. Nos. 3,821,130, 3,888,803, 4,280,007, 4,294,934 and 4,374,210.

Similarly, the epoxy terminated oxazolidone polymer precursor can be reacted in conventional manner with epoxy curing agents to form epoxy coatings, resins, adhesives and the like. Epoxy curing agents include diamines and other compounds containing two or more groups which react with epoxy groups to form a bond thereto. Exemplary epoxy curing agents and methods for preparing cured epoxy resins are described, for example, in Lee and Neville, Handbook of Epoxy Resins, McGraw-Hill Book Co., New York (1967).

Those polyurethane polymers and cured epoxy resins prepared using the oxazolidone polymer or precursor in this invention exhibit excellent thermal properties. In addition, such polymers exhibit good chemical and solvent stability. Further, these polymers have generally good impact properties as compared to conventional oxazolidones polymers.

In preparing polyurethanes or cured epoxy resins according to this invention additives such as fillers, fibers, antioxidants, internal mold release agents, pigments, surfactants, catalysts, blowing agents and the like can all be employed in conventional manner.

The following examples are provided to illustrate the invention but not to limit the scope thereof. All parts and percentages are by weight unless otherwise indicated.

EXAMPLES 1 AND 2

In a suitable flask are charged 6.6 grams of a 174 equivalent weight bisphenol A/epichlorhydrin epoxy resin, 15.4 grams of toluenediisocyanate, 0.2 grams triphenyl antimony and 0.39 grams of iodine. With stirring, the mixture is heated to 150° C. and held at this temperature for 10 minutes. The reaction mixture is then cooled and analyzed by infrared spectroscopy and gel permeation chromatography. These tests indicate the formation of oxazolidone rings, the complete disappearance of the epoxide groups and the substantial absence of isocyanurate groups. Nuclear magnetic resonance spectroscopy verifies the existence of only very small quantities of isocyanurate groups.

This experiment is repeated, this time employing 1.0 gram of the epoxy resin, 9.0 grams of toluene diisocyanate and as the catalyst 0.3 milliliters of tri-n-butylantimony and 0.3 g iodine. The reaction is conducted for 8 min. at 150° C. The analysis of this product again shows the formation of essentially no trimerized isocyanurates.

EXAMPLES 3 TO 7

Isocyanate terminated oxazolidone precursors are prepared from a brominated bisphenol A/epichlorohydrin epoxy resin having an equivalent weight of about 325, toluene diisocyanate (TDI) or diphenylmethane diisocyanate (MDI) and an triorganoantimony di- or tetraiodide catalyst as indicated in the following table. The reaction conditions are also specified in the following table. All of these reactions produce isocyanate terminated oxazolidone polymer precursors containing insignificant quantities of trimerized isocyanates.

TABLE I

| Example No. | Starting Material | Volume (ml) | Catalyst Type | Catalyst Amount | Reaction Temp (°C.) | Reaction Time (min) |
|---|---|---|---|---|---|---|
| 3 | 30 wt % epoxy resin in TDI | 25 ml | $Ph_3SbI_4$ | 0.34 g | 150–175° | 10 |
| 4 | 30 wt % epoxy resin in MDI | 50 ml | $Ph_3SbI_4$ | 0.80 g | 95 | 30 |
| 5 | 21 wt % epoxy resin in MDI | 25 ml | $Ph_3SbI_2$ | 0.19 g | 85–115 | 20 |
| 6 | 20 wt % epoxy resin in MDI | 25 ml | $Ph_3SbI_4$ | 0.27 g | 95 | 20 |
| 7 | 40 wt % epoxy resin in MDI | 50 ml | $Ph_3SbI_4$ | 1.08 g | 95–135 | 10 |

EXAMPLE 8

In a test tube are placed 1 gram of a 3.5 functional epoxy phenol novolac resin, 9 grams toluene diisocyanate, 0.02 gram triphenyl antimony and 0.03 gram iodine. The test tube and its contents are heated to 150° C. for 20 minutes. Infrared analysis of the resulting isocyanate-terminated polymer precursor verifies the formation of oxazolidone groups, but does not reveal any detectable isocyanurate.

EXAMPLE 9

In a test tube are reacted at 150° C. for 20 minutes, 1 gram of a 320 equivalent weight epoxy-terminated poly(propylene oxide), 9 gram toluene diisocyanate 0.02 gram triphenyl antimony and 0.03 gram iodine. Infrared analysis verifies the existence of oxazolidone groups in the product, but no isocyanurates are detected. The resulting isocyanate-terminated polymer precursor has an average molecular weight of about 1000.

EXAMPLE 10

To one equivalent (163.3 g) of a triglycidyl ether of 4,4′,4″-trihydroxy triphenyl methane are added, at 95° C., 0.44 g triphenylantimony and 0.64 g iodine. Isophorone diisocyanate, 11.1 g (0.1 equivalent) is then added and the mixture heated to 150° C. After reacting for six hours at 150° C., the product epoxy-terminated polymer precursor contains 88 mole percent oxazolidone and 12 mole percent residual carbamate groups, with essentially no trimer. The equivalent weight of the product is about 206.

To 80 g of the polymer precursor is added 19.2 g methylene dianiline to form a cured epoxy resin. A film cast from the curing resin exhibits excellent thermal stability.

EXAMPLE 11

To one equivalent (163.3 g) of a triglycidyl ether of 4,4′,4″-trihydroxy triphenyl methane are added, at 110° C., 0.44 g of triphenylantimony and 0.64 g iodine. Toluene diisocyanate (2.68 g, 0.031 eq) is added and the reaction mixture is heated at 105° C. for 20 minutes. Hexamethylene diisocyanate (HMDI) (3 ml, ~0.035 eq) is then added and allowed to react for ten minutes, at which time an additional 0.11 eq of HMDI are added. The mixture is then permitted to react an additional 6 hours at 110° C. The product epoxy-terminated polymer precursor contains 3 mole percent isocyanurate groups.

What is claimed is:

1. In a process for preparing a polyoxazolidone in the reaction of a polyepoxide and a polyisocyanate, the improvement which comprises reacting said polyepoxide and polyisocyanate in the presence of a catalytic amount of an organoantimony iodide.

2. The process of claim 1 wherein said organoantimony iodide contains a pentavalent antimony atom.

3. The process of claim 2 wherein said organoantimony iodide is represented by the structure $$R_3Sb(V)I_n$$

wherein n is 2 or 4 and each R is independently an inertly substituted aliphatic, cycloaliphatic, aromatic or aralkyl group.

4. The process of claim 3 wherein each R is independently an aromatic group having 12 or fewer carbon atoms, an inertly substituted $C_4$-$C_{12}$ alkyl group, or an unsubstituted or inertly substituted benzyl group.

5. The process of claim 4 wherein the organoantimony iodide comprises triphenylantimony tetraiodide.

6. The process of claim 3 wherein the equivalent ratio of the polyepoxide to the polyisocyanate is from about 1:10 to about 10:1.

7. The process of claim 6 wherein an excess of said polyepoxide is employed and the polyoxazolidone contains terminal epoxy groups.

8. The process of claim 6 wherein an excess of said polyisocyanate is employed and the polyoxazolidone contains terminal isocyanate groups.

9. The process of claim 7 wherein said polyepoxide and polyisocyanate each have an average functionality of about 2 to 3.

10. The process of claim 8 wherein said polyepoxide and polyisocyanate each have an average functionality of about 2 to 3.

11. The process of claim 9 wherein said polyepoxide is a reaction product of a bisphenol or halogenated derivative thereof with an epihalohydrin and said polyisocyanate is toluene diisocyanate, diphenylmethane diisocyanate, or mixture thereof.

12. The process of claim 10 wherein said polyepoxide is a reaction product of a bisphenol or halogenated derivative thereof and said polyisocyanate is toluene diisocyanate, diphenylmethane diisocyanate, or mixture thereof.

13. A polyurethane polymer prepared by reacting an isocyanate-terminated poly-oxazolidone polymer containing less than about 15 mole percent isocyanurate groups with a material having a plurality of active hydrogen atoms.

14. A cured epoxy resin prepared by reacting an epoxy-terminated polyoxazolidone polymer containing less than about 15 mole percent isocyanurate groups with a diamine.

* * * * *